United States Patent [19]

Suzuki et al.

[11] Patent Number: 4,791,023

[45] Date of Patent: Dec. 13, 1988

[54] INFRARED ABSORBENT AND OPTICAL MATERIAL USING THE SAME

[75] Inventors: Yoshiaki Suzuki; Gouichi Hayashi; Masayoshi Tsuboi, all of Minami-ashigara, Japan

[73] Assignee: Fuji Photo Film Co., Ltd., Kanagawa, Japan

[21] Appl. No.: 751,448

[22] Filed: Jul. 3, 1985

[30] Foreign Application Priority Data

Jul. 7, 1984 [JP] Japan ................. 59-139769
Sep. 20, 1984 [JP] Japan ................. 59-197042
Nov. 1, 1984 [JP] Japan ................. 59-228907

[51] Int. Cl.$^4$ .......................... F21V 9/04; F21V 9/06
[52] U.S. Cl. ........................... 428/336; 556/33; 252/587; 252/588; 428/411.1
[58] Field of Search .............. 350/311; 252/582, 587, 252/600; 556/33; 428/336, 411.1

[56] References Cited

U.S. PATENT DOCUMENTS

3,298,959 1/1967 Marks et al. .................. 252/587
4,045,125 8/1977 Farges ........................ 427/160 X

FOREIGN PATENT DOCUMENTS

2457572 6/1975 Fed. Rep. of Germany ...... 252/587
2510689 9/1976 Fed. Rep. of Germany .

OTHER PUBLICATIONS

Megnamisi-Belombe, "1,2 Benzoquinone Dioxime . . .", 1978, Annals New York Academy of Sciences, pp. 633-650.
Brown, "Rational Synthesis of Unidimensional . . .", 1979, J.A.C.S., pp. 2937-2947, 101:11.
Pomposo, "Iron Benzoquinone Dioxime Complexes . . .", Inorg. Chem. 1983, 22, 569-571.
Keller, "Kristallisierte Charge Transfer . . .", Mol. Cryst. Liq. Cryst. 1976, vol. 32, pp. 155-156.
Brown, "Rational Synthesis of Unidimensional . . .", Report TR-6, Order No. AD-A059642, p. 68, from Gov. Rep. Announce. Index. (U.S.) 1979 79(2), 84.
Thabet, "Solid-Phase Synthetic Inorganic Reactions", Inorg. Nucl. Chem. Lett., vol. 8, pp. 211-213, 1972.
Keller, "Kristalline Addukte . . .", Z. Anorg. Allg. Chem. 429, 231-236, (1977).
Keller, "The Diffuse X-Ray Scattering and Structure . . .", Acta. Cryst. 1976, A-32, 954-957.
Leichert, "Die Struktur von . . .", Acta. Cryst. 1975, B-31, 2877.
Marks, "Assessing the Degree of Partial . . .", J.C.S. Chem. Comm. 1976, pp. 444-445.
Endres, "Oxidations Produckt von . . .", Acta. Cryst. 1975, B-31, 2357.
Kalinichenko, "Multiplicity of Bonds . . .", Russian Jour. of Inorg. Chem., vol. 29 (9), pp. 2416-2417.
Kalinichenko, "Complexes of $Mn^{II}$, $Fe^{II}$, $Co^{II}$ and $Zn^{II}$ . . .", Russian Jour. of Inorg. Chem. 29(8), 1984.
Endres, "Kristallisierte Koordinationsverbindungen . . .", Zeitschrift fuer Naturforschung, Teil B, V. 30B-7-8, 1975.
Brill, "Optical and Elastic . . ." J. Chem. Phys. 68(2), Jan. 15, 1978.
Eltsov "Complexes with Organic Ligands . . .", Zh. Obshch-Khim, 51(1), 146-166 (CA94-210276m).

*Primary Examiner*—Matthew A. Thexton
*Assistant Examiner*—Catherine S. Kilby
*Attorney, Agent, or Firm*—Birch, Stewart, Kolasch & Birch

[57] ABSTRACT

An infrared absorbent comprising α-diimine metal complex is disclosed. With the use of the infrared absorbent, there is provided an infrared absorbing material capable of absorbing a near-infrared light having a wavelength of 700-1500 nm and a far-infrared light. The infrared absorbent has a good fastness to heat and light. The infrared absorbing material is suitable for an optical filter and optical information recording medium.

26 Claims, 2 Drawing Sheets

INFRARED ABSORBENT AND OPTICAL MATERIAL USING THE SAME

BACKGROUND OF THE INVENTION (1) Field of the Invention

This invention relates to a novel infrared absorbent for absorbing near infrared rays having a wavelength of 700–1500 nm or far infrared rays and also relates to an infrared absorbing material using the infrared absorbent such as an optical filter and an optical information recording medium.

(2) Description of the Prior Art

Examples of applications of metal complexes to the infrared absorbent can be found in U.S. Pat. Nos. 3,588,216; 3,663,089; 3,850,502; 3,875,199; 3,979,583; 4,062,867; 4,152,332; and 4,335,952; Japanese Patent Publication Nos. 3452/71 and 7454/77; and Japanese Patent Application (OPI) Nos. 31748/74, 135886/76, 25060/79 and 21458/82.

However, the infrared absorbent of metal complexes as disclosed in the above references mostly has an absorption maximum at a long wavelength of 850 nm or more. Further, to prepare the metal complexes having an absorption maximum at 800 nm or less, it was required to employ an expensive metal such as platinum, and it was difficult to produce the metal complex industrially.

Further, conventional infrared absorbents of organic dyestuffs were not sufficient in light and heat fastness in general, and thus most of them were not satisfactory in practical use.

Heretofore, various applications of an infrared absorbing material capable of selectively absorbing rays of a far infrared light or a near infrared light having a wavelength of 700–1500 nm has been proposed. The following is five examples of conventional primary applications of the infrared absorbing material.

(1) Safelight filter for infrared-sensitive materials:

Recently, there have been developed many silver halide light sensitive materials (which will be hereinafter referring to as "light sensitive materials") which are sensitive to rays of a far infrared light or a near infrared light having a wavelength of 700 nm or more. That is, light sensitive materials are made to have an infrared sensitivity irrespective of distinction of black and white photographs or color photographs including a normal-type, instant-type and thermal developed-type photographs, so as to be useful for an artificial color photograph for resource search or to be exposable with a light emission diode capable of emitting a light in an infrared area.

Conventionally, a safelight filter for a panchromatic photosensitive material has been used as such infrared-sensitive materials.

(2) Control of growth of plants:

It has been long known that a so-called morphogenesis with regard to growth and differentiation of plants such as germination of seed, extension of stem, development of leaf, budding of flower and formation of tuber is influenced by a light, and it has been studied as a photomorphogenesis. It is also known that a red light having a wavelength of about 660 nm and a red light having a wavelength of about 720–730 nm antagonistically function to each other, and therefore time of flowering or earing, extent of growth or yield of fruits can be varied by changing a proportion of both the lights. Such a study has been made by controlling a spectral energy distribution of a light with use of a light source lamp and a filter in combination. Therefore, it was difficult to carry out a test in a large-scale green house or farm.

If a plastic film capable of selectively absorbing rays having a wavelength of 700 nm or more is obtainable, it will be possible to control a spectral energy distribution of a light to adapt the above-mentioned principle to an actual product cite, thereby providing a great progress and profit to an equipped agriculture. For example, it is expected that earing time may be delayed or growth may be controlled by covering plants with a near-infrared absorbing film at a specific time to cut-off light having a wavelength of 700 nm or more. (See "Chemical Control of Plants", Katsumi Ineda, Vol. 6, No. 1 (1971))

(3) Cut-off of heat radiation:

Among solar radient energy rays of a near infrared and an infrared area having wavelength of 800 nm or more is absorbed by an object and converted to a thermal energy. In addition, a large part of its energy distribution is converged at a near infrared area having a wavelength of 800–2000 nm. Accordingly, a film capable of selectively absorbing rays of a near infrared light is remarkably effective for cut-off of a solar energy, and its is possible to suppress an increase in temperature in a room admitting visible light. Such a film may be adapted to a window of a house, office, store, automobile and airplane, etc. as well as gardening green house. In particular, as to the green house, a temperature control is very important, and if temperature is excessively elevated, plants will be greatly damaged to finally result in withering. Accordingly, when the near infrared absorbing film is used, the temperature control may be rendered easy, and a new technique such as retarded cultivation in summer may be developed. A conventional heat radiation cutting-off material includes a thin metallic layer deposited on a surface of a plastic film or an inorganic compound, e.g., FeO dispersed in a glass.

(4) Cut filter of infrared rays noxious to tissues of human eyes:

Infrared rays contained in sun light or in light radiated in welding have a harmful influence to tissues of human eyes. One of the primary applications of the infrared cut filter is an application to spectacles for protecting the human eyes from rays of light containing such harmful infrared rays, e.g., sunglasses and protecting glasses in welding.

(5) Infrared cut filter for semiconductor light receiving element:

In another field where development of this kind of infrared absorbing plastics is most intensively desired, the infrared absorbing plastics are adapted to an infrared cut filter for a photosensor to make the spectral sensitivity of a semiconductor light receiving element such as silicon photo diode (which will be hereinafter referred to as SPD) approach to a relative spectral sensitivity curve.

Presently, SPD is mainly used as a light receiving element of a photosensor used in an automatic exposure meter for a camera or the like. FIG. 2 shows a graph of the relative spectral sensitivity curve and that of a relative value of an output of SPD to each wavelength.

In order to use SPD for an exposure meter, it is required to cut-off a light in an infrared area which is not sensitive to human eyes and to make the spectral sensitivity curve of SPD shown in FIG. 2 approach to the relative spectral sensitivity curve. Particularly, as an output of SPD is large to the light having a wavelength of 700–1100 nm, and the eyes are insensitive to such a light, this is one of factors of malfunction of the exposure meter. Therefore, if it is possible to use an infrared absorbing plastic film suppressing an absorption of a visible light area, while permitting an absorption of an infrared light area in the entire range of 700–1100 nm, light transmittance in a visible area may be increased and an output of SPD may be also increased. Thus, it will be possible to apparently remarkably improve a performance of the exposure meter.

Conventionally, this kind of photosensor has been practically used by mounting an infrared cut filter made of glass containing an inorganic infrared absorbent to a front surface of SPD.

(6) Infrared cut-off filter for color solid pick-up element:

Recently, the combination of a color solid pick-up element and a micro color filter has been widely used for a camera for video tape recorder or the like. A photoconductive film and a solid pick-up element used for a usual pick-up tube are sensitive even in a wavelength area of 700 nm or more. Therefore, in order to separate a visible light having a wavelength of 400–700 nm, it is necessary to cut off near infrared rays of 700 nm or more. To this end, a near-infrared cut-off optical filter material has been conventionally used by forming a multi-layer interference film of inorganic materials on the surface of a lens by a vacuum evaporation process, but, differences between lenses are large. Then, if it is possible to form an infrared cut-off layer on a color separation filter layer by a lamination process or an on-wafer process, a satisfactory color reproduction may be expected without being influenced by the lens differences.

In this connection, it has been intensively desired to develop an infrared cut-off filter material to be incorporated in such a color pick-up tube and a color solid pick-up device using CCD (charge coupled device) and MOSFET (insulated gate type field effect device).

(7) Heat converter of visible and infrared rays:

The infrared absorbing material as a reaction acceleraor can be added to a thermodrying or thermosetting composition.

(8) Application to optical information recording medium for laser beam writing:

Conventionally, there are many known optical recording mediums for laser beam writing. The optical recording medium is typically formed by depositing a metal, metalloid or non-metal on a substrate by evaporation, or by depositing a dye by evaporation or coating the same on the substrate. Such application to a laser beam recording/reading medium is, for example, described in Japanese Patent Application (OPI) No. 11090/82.

However, with respect to the above-mentioned applications, the conventional infrared absorbing materials as used had the following shortcomings.

The safelight filter for the panchromic photosensitive material in the afore-mentioned applications (1) permits a green light having a high luminosity factor to be partially transmitted, and also permits a large quantity of infrared light to be transmitted to cause fogging. For this reason, such a safelight filter has not been able to achieve its object for infrared-senstive materials.

In the applications (3), the metallic layer deposited plastic film or the FeO dispersed glass functions to intensively absorb not only infrared light but also visible light to cause reduction in inside luminance. For this reason, such as plasic film or glass is not suitable for agricultural uses because of lack of an absolute quantity of sunshine. Especially, the filter material for growth control of plants in the applications (2) is required to selectively absorb a light having a wavelength of 700–750 nm, and therefore the metallic layer deposited film is quite unsuitable for such an object.

Furthermore, in the applications (5), the infrared cut filter using the infrared absorbent containing an inorganic substance is relatively fast to heat and light, but light transmittance in a visible area is low. To cope with this, a sensitivity of SPD was intended to be increased. However, an increase in the sensitivity of SPD results in an increase in leak current to cause a malfunction of the photosensor, resulting in a big problem in reliability. Additionally, since the infrared cut filter contains an inorganic substance, there is a lack in flexibility in production of a photosensor and a difficulty in improving a production process. Further, the infrared cut filter containing an inorganic substance causes a high production cost to result in a great increase in cost of the photosensor.

Furthermore, in the applications (8), the optical information recording medium prepared by depositing metal, etc. by vapor deposition had a defect in its productivity and was inferior in oxidation resistance and hydrolysis resistance of a recording layer. On the other hand, many of the optical information recording mediums prepared by coating or evaporations-depositing dyes did not have an absorption in a wavelength area of a semiconductor laser beam as used. Further even if the recording medium had an absorption in the wavelength area, weather resistance was not satisfactory. These optical information recording mediums were also not satisfactory in such that they had low sensitivity to a semiconductor laser beam and low stability.

SUMMARY OF THE INVENTION

Accordingly, it is a primary object of the present invention to provide an infrared absorbent containing α-diimine metal complex, infrared absorbent composition containing the same and an infrared absorbing material using the same (e.g., optical materials such as an optical filter and optical information recording medium).

It is another object of the present invention to provide a near-infrared absorbent having an absorption maximum in a wavelength range of 700–900 nm.

It is another object of the present invention to provide an infrared absorbent capable of absorbing near-infrared rays which has a high transmittance of visible light and good fastness to heat and light.

It is a further object of the present invention to provide an infrared absorbent which especially has a superiority in infrared cut-off performance of a SPD (silicon photo diode) or a color solid pick-up tube.

It is a further object of the present invention to provide an infrared absorbent which may be adjusted in solubility to a solvent by suitably selecting and combining cations relative to a complex ion, and can be widely used in combination with various binders.

It is a further object of the present invention to provide an infrared absorbent which can be employed for various applications including the afore-mentioned applications, that is, for a safelight filter for infrared-sensitive materials, control of growth of plants, cut-off of heat radiation, cut filter of infrared rays harmful to tissues of human eyes, infrared cut filter for semiconductor light receiving elements or color solid image pick-up elements, and infrared cut filter for an optelectronic integrated circuit wherein electrical and optical elements are incorporated in the same substrate.

It is still a further object of the present invention to provide an optical filter using the above-mentioned infrared absorbent which has a superior fastness to heat and light and a superior filter function.

It is still a further object of the present invention to provide a semiconductor laser recording medium using the above-mentioned infrared absorbent which has an absorption in a near infrared area, and has a high sensitivity and stability.

Other and further objects, features and advantages of the invention will appear more fully from the following description taken in connection with the accompanying drawings.

DETAILED DESCRIPTION OF THE INVENTION

Figure 1:
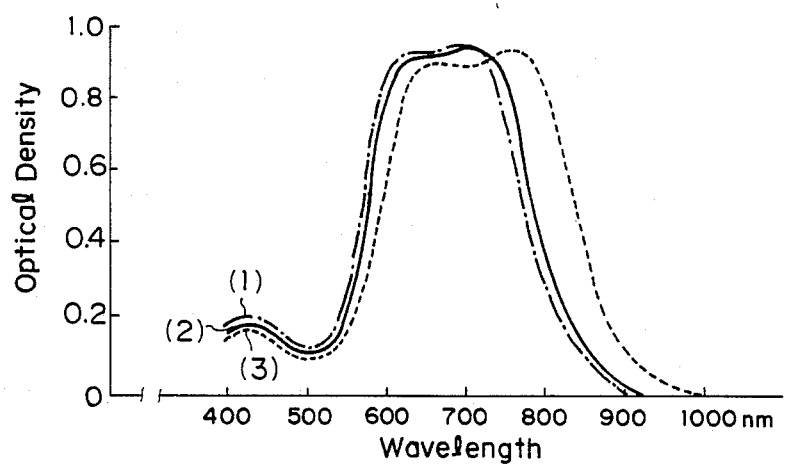
FIG. 1 is a graph of optical density curves of the optical filter obtained in Example 1.
Figure 2:
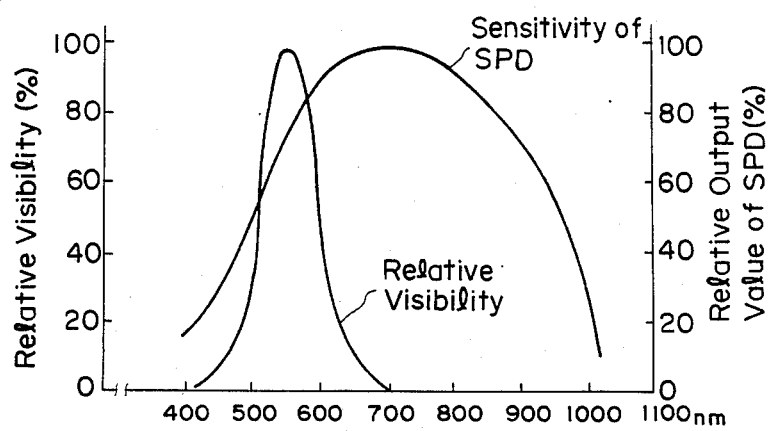
FIG. 2 is a graph of relative sensitivity curves of human eyes and SPD with respect to a light wavelength.

The present invention provides an infrared absorbent comprising at least one of the compounds represented by the following general formulae [I]–[VI].

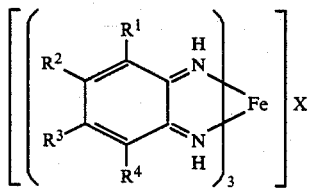

[I]

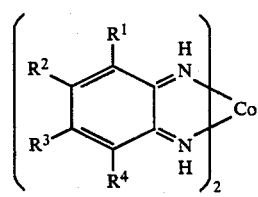

[II]

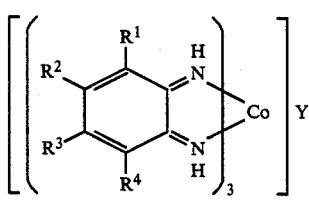

[III]

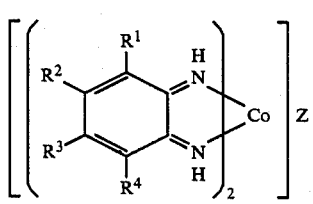

[IV]

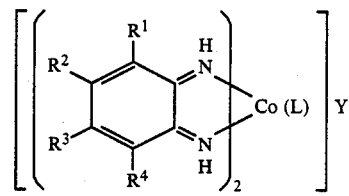

[V]

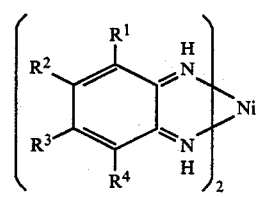

[VI]

(Wherein, $R^1$ to $R^4$ each independently represents a hydrogen atom, halogen atom, cyano group or hydroxyl group, or alkyl, aryl, cycloalkyl or heterocyclic group which may be bonded through a divalent connecting group to a benzene ring, or a group of nonmetal atoms to form at least one 5-membered of 6-membered ring by bonding of $R^1$ and $R^2$, $R^2$ and $R^3$ or $R^3$ and $R^4$, $R^1$ to $R^4$ may be the same or different; X and Y represent anions capable of neutralizing cations in the above-mentioned general formulae; Z represents a halogen and thiocyanate ion; and L represents a monodentate ligand containing a nitrogen, phosphorus or sulphur atom as a coordinate element).

Further, the present invention provides an infrared absorbent composition and material comprising at least one of the compounds represented by general formulae [I]–[VI].

With respect to oxidation state of the ligand in the complex represented by general formulae [I]–VI] employed in the present invention, there is an argument about it, but it is generally considered that the ligand has any one of structures as shown in the following formulae; that is, o-phenylenediamine dianion, o-benzosemiquinonediimine radical anion or o-benzoquinonediimine. (See, for example, JACS 88 5201 (1966))

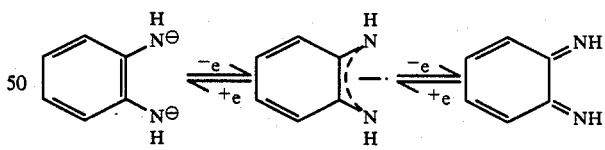

In the specification and the claims, although the ligand is shown by the complex structure of o-benzoquinoneimine, this is only for an expedient description, and it should be noted that the oxidation state of the ligand in the present invention is not limited thereto.

It is considered that an iron or nickel as the center metal in the complexes of formulae [I] to [VI] is normally divalent. The counter ion of a complex ion effects to maintain an electrically neutralized condition as a whole, and X in formula [I] is normally negative and divalent in most cases. For example, X consists of two monovalent anions, one divalent anion or 2/3 trivalent anion.

It is considered that a formal valency of a cobalt or nickel as a center metal in the complexes of formulae

[II] and [IV] is normally zero, and that a formal valency of center metals in the complexes of formulae [III]-[V] is normally one.

Y or Z to electrically neutralize the compound in formulae [III]-[V] are normally rendered negative and monovalent. For example, Y and Z each consists of a monovalent anion or ½ divalent anion.

The metal complexes employed in the present invention will now be described in detail.

Examples of the halogen atoms represented by $R^1$ to $R^4$ in the compounds of general formulae [I]-[VI] may include a fluorine, chlorine, bromine and iodine atom.

The alkyl group as represented by $R^1$ to $R^4$ is preferably an alkyl group containing 1 to 20 carbon atoms which may be a straight or branched chain alkyl group. Typical examples of the alkyl group may include a methyl, ethyl, propyl, butyl, hexyl, octyl, decyl, dodecyl, hexadecyl and octadecyl group. The alkyl group may be further substituted.

The aryl group as represented by $R^1$ to $R^4$ is preferably an aryl group containing 6 to 14 carbon atoms. Typical examples of the aryl group may include a phenyl and naphtyl group. The aryl group may be further substituted.

The heterocyclic group as represented by $R^1$ to $R^4$ is preferably a five-membered or six-membered ring containing at least one of nitrogen, oxygen and sulphur atoms as a hetero atom in the ring. Typical examples of the heterocyclic group may include a furyl, hydrofuryl, thienyl, pyrrolyl, pyrrolidyl, pyridyl, imidazolyl, pyrazolyl, quinolyl, indolyl, oxazolyl and thiazolyl group. The heterocyclic group may be further substituted.

The cycloalkyl group as represented by $R^1$ to $R^4$ is preferably a five-membered or six-membered ring group. Typical examples of the cycloalkyl group may include a cyclopentyl, cyclohexyl, cyclohexenyl and cyclohexadenyl group. The cycloalkyl group may be further substituted.

Typical examples of the six-membered ring formed by bonding $R^1$ and $R^2$, $R^2$ and $R^3$ or $R^3$ and $R^4$ may include a benzene, naphthalene, cyclohexadiene, iso-benzothiophene, iso-benzofuran and iso-indoline ring. The six-membered ring may be further substituted or condensed therein.

The above-mentioned alkyl, aryl and heterocyclic group as represented by $R^1$ to $R^4$ may be bonded to carbon atoms of the benzene ring via the divalent connecting group such as an oxy (—O—), thio (—S—), amino, oxycarbonyl, carbonyl, carbamoyl, sulfamoyl, carbonylamino, sulfonyl or carbonyloxy group.

Examples of groups represented by $R^1$ to $R^4$ wherein an alkyl group are bonded through the divalent connecting group to the carbon atom in the benzene ring may include an alkoxy group (e.g., a methoxy, ethoxy, propoxy, butoxy, n-decyloxy, n-dodecyloxy or n-hexadecyloxy group), an alkoxycarbonyl group (e.g., a methoxycarbonyl, ethoxycarbonyl, butoxycarbonyl, n-decyloxycarbonyl or n-hexadecyloxycarbonyl group), an acyl group (e.g., an acetyl, valeryl, stearoyl, benzoyl or toluoyl group), an acyloxy group (e.g., an acetoxy or hexadecylcarbonyloxy group), an alkylamino group (e.g., a N-methylamino, N-ethylamino, N,N-dimethylamino or N,N-dibutylamino group), an alkylcarbamoyl group (e.g., a butylcarbamoyl, N,N-diethylcarbamoyl or n-dodecylcarbamoyl group), an alkylsulfamoyl group (e.g., a butylsulfamoyl, N,N-diethylsulfamoyl or n-dodecylsulfamoyl group), a sulfonylamino group (e.g., a methylsulfonylamino or butylsulfonylamino group), a sulfonyl group (e.g., a mesyl or ethane sulfonyl group), or an acylamino group (e.g., an acetylamino, valerylamino, palmitoylamino, benzoylamino or toluoylamino group).

Examples of groups represented by $R^1$ to $R^4$ wherein an aryl group is bonded through the divalent connecting group to the carbon atom in the benzene ring may include an aryloxy group (e.g., a phenoxy or naphtoxy group), an aryloxycarbonyl group (e.g., a phenoxycarbonyl or naphtoxycarbonyl group), an acyl group (e.g., a benzoyl or naphtoyl group), an anilino group (e.g., a phenylamino, N-methylanilino or N-acetylanilino group), an acyloxy group (e.g., a benzoyloxy or toluoyloxy group), an arylcarbamoyl group (e.g., a phenylcarbamoyl group), an arylsulfamoyl group (e.g., a phenylsulfamoyl group), an arylsulfonylamino group (e.g., a phenylsulfonylamino, p-tolylsulfonylamino group), an arylsulfonyl group (e.g., a benzenesulfonyl or tosyl group), or an acylamino group (e.g., benzoylamino group).

The above-mentioned alkyl, aryl, heterocyclic, cycloalkyl group or preferable condensated six-membered ring formed by bonding $R^1$ and $R^2$, $R^2$ and $R^3$ or $R^3$ and $R^4$ as represented by $R^1$ to $R^4$ may further be substituted by a halogen atom (e.g., a fluorine, chlorine, bromine or iodine atom), a cyano group, a hydroxyl group, a straight or branched chain alkyl group (e.g., a methyl, ethyl, propyl, butyl, hexyl, octyl, decyl, dodecyl, tetradecyl, hexadecyl, heptadecyl, octadecyl or methoxyethoxyethyl group), an aryl group (e.g., a phenyl, tolyl, naphtyl, chlorophenyl, methoxyphenyl or acetylphenyl group), an alkoxy group (e.g., a methoxy, ethoxy, butoxy, propoxy or methoxyethoxy group), an aryloxy group (e.g., a phenoxy, tolyoxy, naphtoxy or methoxyphenoxy group), an alkoxycarbonyl group (e.g., a methoxycarbonyl, butoxycarbonyl or phenoxymethoxycarbonyl group), an aryloxycarbonyl group (e.g., a phenoxycarbonyl, tolyoxycarbonyl or methoxyphenoxy carbonyl group), an acyl group (e.g., a formyl, acetyl, valeryl, stearoyl, benzoyl, toluoyl, naphtoyl or p-methoxybenzoyl group), an acyloxy group (e.g., an acetoxy or acyloxy group), an acylamino group (e.g., an acetamido, benzamido or methoxyacetamido group), an anilino group (e.g., a phenylamino, N-methylanilino, N-phenylanilino or N-acetylanilino group), an alkylamino group (e.g., a n-butylamino, N,N-diethylamino, 4-methoxy-n-butylamino group), a carbamoyl group (e.g., n-butylcarbamoyl, N,N-diethylcarbamoyl group ), a sulfamoyl group (e.g., a n-butylsulfamoy, N,N-diethylsulfamoyl, n-dodecylsulfamoyl or N-(4-methoxy-n-butylsulfamoyl group), a sulfonylamino group (e.g., a methylsulfonylamino, phenylsulfonylamino or methoxymethylsulfonylamino group), or a sulfonyl group (e.g., a mesyl, tosyl or methoxy methanesulfonyl group).

In the compounds represented by formulae [I]-[VI], X stands for 2/m m-valent anions. X normally consists of two monovalent ions. Examples of the monovalent anions may include a halogen ion (e.g., Cl⁻, Br⁻, I⁻), nitrate ion ($NO_3^-$), tetrafluoroborate ion ($BF_4^-$), hexafluorophosphate ion ($PF_6^-$), carboxylate ion (e.g., $CH_3CO_2^-$, $CF_3CO_2^-$), sulfonate ion

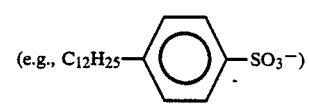

and tetraphenylborate ion ($B(C_6H_5)_4^-$). Preferably, the monovalent anion is a hexafluorophosphate ion, sulfonate ion and tetraphenylborate ion.

Examples of the divalent or multivalent anion represented by X may include a sulphate ion ($SO_3^{2-}$), carbonate ion ($CO_3^{2-}$), hexafluoroaluminate ion, hexafluoroantimonate ion, hexafluoronickelate ion and hexafluorosilicate ion.

In the compounds represented by formulae [I]–[VI], Y stands for 1/n n-valent anions. Y normally consists of one monovalent ion. Examples of the monovalent anions may include a halogen ion (e.g., $Cl^-$, $Br^-$, $I^-$), nitrate ion ($NO_3^-$), tetrafluoroborate ion ($BF_4^-$), hexafluorophosphate ion ($PF_6^-$), carboxylate ion (e.g., $CH_3CO_2^-$, $CF_3CO_2^-$), sulfonate ion

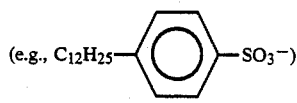

and tetraphenylborate ion ($B(C_6H_5)_4$). Preferably, the monovalent anion is a hexafluorophosphate ion, sulfonate ion and tetraphenylborate ion.

Examples of the divalent or multivalent anion represented by Y may include a sulphate ion ($SO_3^{2-}$), carbonate ion ($CO_3^{2-}$), hexafluoroaluminate ion, hexafluoroantimonate ion, hexafluoronickelate ion and hexafluorosilicate ion.

Z includes a fluorine, chlorine, bromine and idine atom, or $SCN^-$. The monodentate ligand represented by L is preferably a five-membered or six-membered heterocyclic ring containing nitrogen or sulphur atom, and a tertiary phosphine, and more preferably a five-membered or six-membered heteroaromatic compound containing nitrogen or sulphur atom (e.g., pyridine and thriophene) and a tertiary phosphine (e.g., triphenyl phosphine).

Preferable center metal of the complex used in the present invention is especially an iron from a viewpoint of stability, and a cobalt and nickel follow in this order.

The compound represented by formula [I] as employed in the present invention may be synthesized, for example, in the following manner. That is, a ferrous salt and o-phenylenediamine or its salt are refluxed with heat in the inert atmosphere to obtain bis-o-phenylenediaminato iron complex. Then, the complex is oxidized by air at room temperature in the presence of a dehydrating agent. Such a synthesized compound is subjected to anion-exchanging as required and is purified to give various desired compounds.

The compound represented by formula [II] as employed in the present invention may be obtained for example in the following manner.

(1) Cobalt chloride (hexahydrate) is dissolved in concentrated aqueous ammonia, and is aerated. Then, corresponding diamine is added to the solution.

(2) Cobalt chloride anhydride is dispersed in a suitable solvent (preferably, ethers), and corresponding diamine is added to the dispersion. Then, a reducing agent such as t-butyl lithium is added to the dispersion at low temperatures.

The compound represented by formula [III] as employed in the present invention may be obtained in one example by dissolving cobalt acetate in concentrated aqueous ammonia and aerating the solution, then adding a salt of corresponding anion to the solution.

The compound represented by formula [IV] as employed in the present invention may be obtained by mixing the $PF_6$ salt which is one of the compounds represented by formula [III] with an alkali metal salt of corresponding anion, to proceed anion-exchanging.

The compound represented by formula [V] as employed in the present invention may be obtained by mixing the $PF_6$ salt which is one of the compound represented by formula [III] with corresponding ligand.

The compound represented by formula [VI] as employed in the present invention may be obtained by dissolving o-phenylenediamine derivative in a suitable organic solvent compatible with water (e.g., acetone), adding nickel chloride and concentrated aqueous ammonia to the solution, and stirring the solution in the presence of air.

Although preferred compounds as represented by formulae [I]–[VI] will be exemplified in Tables 1 to 5, it should be noted that the present invention is not limited to these exemplified compounds.

TABLE 1

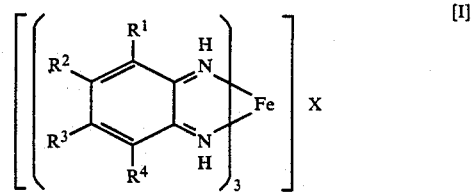

| Compound No. | $R^1$ | $R^2$ | $R^3$ | $R^4$ | X |
|---|---|---|---|---|---|
| 1 | H | H | H | H | a |
| 2 | " | " | " | " | d |
| 3 | " | " | " | " | b |
| 4 | " | " | " | " | c |
| 5 | " | $CH_3-$ | " | " | a |
| 6 | " | " | " | " | b |
| 7 | " | " | " | " | d |
| 8 | " | " | " | " | e |
| 9 | " | " | " | " | c |
| 10 | " | " | $CH_3-$ | " | d |
| 11 | " | " | " | " | e |
| 12 | " | " | " | " | a |
| 13 | " | " | " | " | b |
| 14 | " | H | $C_2H_5-$ | " | b |
| 15 | " | " | $^nC_4H_9-$ | " | b |
| 16 | " | " | $^tC_4H_9-$ | " | a |
| 17 | " | " | " | " | b |
| 18 | " | " | $^nC_6H_{13}-$ | " | b |
| 19 | " | " | $^nC_8H_{17}-$ | " | b |
| 20 | " | " | $^nC_{10}H_{21}-$ | " | b |
| 21 | " | " | $^nC_{12}H_{25}-$ | " | b |
| 22 | " | " | $^nC_{16}H_{33}-$ | " | a |
| 23 | " | " | " | " | b |
| 24 | " | Cl | H | " | b |
| 25 | " | " | " | " | a |
| 26 | " | $CH_3O-$ | " | " | d |
| 27 | " | " | " | " | e |
| 28 | " | " | " | " | a |
| 29 | " | " | " | " | b |
| 30 | " | " | " | " | c |
| 31 | " | $C_2H_5O-$ | " | " | a |
| 32 | " | " | " | " | b |
| 33 | " | $^nC_4H_9O-$ | " | " | a |
| 34 | " | $CH_3(CH_2)_3CH(C_2H_5)CH_2O-$ | " | " | b |
| 35 | " | $^nC_4H_9O-$ | " | " | b |
| 36 | " | $^nC_6H_{13}O-$ | " | " | a |
| 37 | " | " | " | " | b |
| 38 | " | $^nC_8H_{17}O-$ | " | " | a |
| 39 | " | " | " | " | d |
| 40 | " | " | " | " | b |
| 41 | " | $^nC_{12}H_{25}O-$ | " | " | d |
| 42 | " | " | " | " | e |
| 43 | " | $^nC_5H_{11}O-$ | " | " | a |

TABLE 1-continued

[I]

$$\left[\begin{array}{c} R^1 \\ R^2 \\ R^3 \\ R^4 \end{array} \begin{array}{c} H \\ N \\ Fe \\ N \\ H \end{array}\right]_3 X$$

| Compound No. | R¹ | R² | R³ | R⁴ | X |
|---|---|---|---|---|---|
| 44 | " | " | " | " | b |
| 45 | " | $^nC_{12}H_{25}O-$ | " | " | a |
| 46 | " | " | " | " | b |
| 47 | " | $^nC_{16}H_{33}O-$ | " | " | d |
| 48 | " | " | " | " | e |
| 49 | " | " | " | " | a |
| 50 | " | " | " | " | b |
| 51 | " | $^nC_{10}H_{21}O-$ | " | " | b |
| 52 | " | $CH_3CONH-$ | " | " | d |
| 53 | " | " | " | " | a |
| 54 | " | $CH_3SO_2NH-$ | " | " | a |
| 55 | " | " | " | " | b |
| 56 | " | $CH_3NHCO-$ | " | " | a |
| 57 | " | " | " | " | b |
| 58 | " | $(CH_3)_2NCO-$ | " | " | a |
| 59 | " | " | " | " | b |
| 60 | " | $CH_3NHSO_2-$ | " | " | a |
| 61 | " | " | " | " | b |
| 62 | " | $(CH_3)_2NSO_2-$ | " | " | a |
| 63 | " | $CH_3O_2C-$ | " | " | a |
| 64 | " | " | " | " | b |
| 65 | Condensed benzene ring | | " | " | a |
| 66 | " | | " | " | b |
| 67 | " | | " | " | e |
| 68 | " | | Condensed benzene ring | | d |
| 69 | " | | Condensed benzene ring | | e |
| 70 | " | | Condensed benzene ring | | a |
| 71 | " | | Condensed benzene ring | | b |
| 72 | H | $(CH_3)_2N-$ | H | H | a |
| 73 | " | $HO-$ | " | " | b |
| 74 | " | $HO(CH_2)_3-$ | " | " | b |

(NOTE: Symbols (") mean ditto.).
(NOTE: Symbols (a)–(e) of X in Table 1 represent the following anions.)
a: $[PF_6]_2$
b: $[B(C_6H_5)_4]_2$ c: 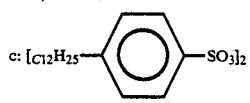 $[C_{12}H_{25} \text{—} \langle \text{—} \rangle \text{—} SO_3]_2$ d: $Cl_2$
e: $I_2$

TABLE 2

[II]

$$\left( \begin{array}{c} R^1 \\ R^2 \\ R^3 \\ R^4 \end{array} \begin{array}{c} H \\ N \\ Co \\ N \\ H \end{array} \right)_2$$

| Compound No. | R¹ | R² | R³ | R⁴ |
|---|---|---|---|---|
| 75 | H | H | H | H |
| 76 | " | $CH_3-$ | " | " |
| 77 | " | " | $CH_3-$ | " |
| 78 | " | H | $^nC_4H_9-$ | " |

TABLE 2-continued

[II]

$$\left( \begin{array}{c} R^1 \\ R^2 \\ R^3 \\ R^4 \end{array} \begin{array}{c} H \\ N \\ Co \\ N \\ H \end{array} \right)_2$$

| Compound No. | R¹ | R² | R³ | R⁴ |
|---|---|---|---|---|
| 79 | " | " | $^tC_4H_9-$ | " |
| 80 | " | " | $^nC_6H_{13}-$ | " |
| 81 | " | " | $^nC_8H_{17}-$ | " |
| 82 | " | " | $^nC_{10}H_{21}-$ | " |
| 83 | " | " | $^nC_{12}H_{25}-$ | " |
| 84 | " | " | $^nC_{16}H_{33}-$ | " |
| 85 | " | Cl | H | " |
| 86 | " | $CH_3O-$ | " | " |
| 87 | " | $C_2H_5O-$ | " | " |
| 88 | " | $^nC_4H_9O-$ | " | " |
| 89 | " | $CH_3(CH_2)_3CHCH_2O-$<br>$\quad\quad\quad\vert$<br>$\quad\quad\quad C_2H_5$ | " | " |
| 90 | " | $^nC_6H_{13}O-$ | " | " |
| 91 | " | $^nC_8H_{17}O-$ | " | " |
| 92 | " | $^nC_{12}H_{25}O-$ | " | " |
| 93 | " | $^nC_{16}H_{33}O-$ | " | " |
| 94 | " | $^nC_{10}H_{21}O-$ | " | " |
| 95 | " | $CH_3CONH-$ | " | " |
| 96 | " | $CH_3SO_2NH-$ | " | " |
| 97 | " | $CH_3NHCO-$ | " | " |
| 98 | " | $(CH_3)_2NCO-$ | " | " |
| 99 | " | $CH_3NHSO_2-$ | " | " |
| 100 | " | $(CH_3)_2NSO_2-$ | " | " |
| 101 | " | $CH_3O_2C-$ | " | " |
| 102 | " | $(CH_3)_2N-$ | " | " |
| 103 | " | $HO-$ | " | " |
| 104 | " | $HO(CH_2)_3-$ | " | " |
| 105 | Condensed benzene ring | | Condensed benzene ring | |
| 106 | Condensed benzene ring | | Condensed benzene ring | |
| 107 | Condensed benzene ring | | Condensed benzene ring | |

(NOTE: Symbols (") mean ditto.)

TABLE 3

[III]

$$\left[ \begin{array}{c} R^1 \\ R^2 \\ R^3 \\ R^4 \end{array} \begin{array}{c} H \\ N \\ Co \\ N \\ H \end{array} \right]_3 Y$$

| Compound No. | R¹ | R² | R₃ | R⁴ | Y |
|---|---|---|---|---|---|
| 108 | H | H | H | H | a |
| 109 | " | " | " | " | b |
| 110 | " | " | " | " | c |
| 111 | " | $CH_3-$ | " | " | a |
| 112 | " | " | " | " | b |
| 113 | " | " | " | " | d |
| 114 | " | " | " | " | e |
| 115 | " | " | " | " | c |
| 116 | " | " | $CH_3-$ | " | d |
| 117 | " | " | " | " | d |
| 118 | " | " | " | " | e |
| 119 | " | " | " | " | a |
| 120 | " | " | " | " | b |

TABLE 3-continued

[III]

| Compound No. | R¹ | R² | R³ | R⁴ | Y |
|---|---|---|---|---|---|
| 121 | " | H | $C_2H_5-$ | " | b |
| 122 | " | " | $^nC_3H_7-$ | " | b |
| 123 | " | " | $^nC_4H_9-$ | " | b |
| 124 | " | " | $^tC_4H_9-$ | " | a |
| 125 | " | " | " | " | b |
| 126 | " | " | $^nC_6H_{13}-$ | " | b |
| 127 | " | " | $^nC_8H_{17}-$ | " | b |
| 128 | " | " | $^nC_{10}H_{21}-$ | " | b |
| 129 | " | " | $^nC_{12}H_{25}-$ | " | b |
| 130 | " | " | $^nC_{16}H_{33}-$ | " | a |
| 131 | " | " | " | " | b |
| 132 | " | Cl | H | " | b |
| 133 | " | $CH_3O-$ | " | " | d |
| 134 | " | " | " | " | e |
| 135 | " | " | " | " | a |
| 136 | " | " | " | " | b |
| 137 | " | " | " | " | c |
| 138 | " | $C_2H_5O-$ | " | " | a |
| 139 | " | " | " | " | b |
| 140 | " | $^nC_3H_7O-$ | " | " | a |
| 141 | " | " | " | " | b |
| 142 | " | $^nC_4H_9O-$ | " | " | a |
| 143 | " | $CH_3(CH_2)_3CH(C_2H_5)CH_2O-$ | " | " | b |
| 144 | " | $^nC_4H_9O-$ | " | " | a |
| 145 | " | $^nC_6H_{13}O-$ | " | " | a |
| 146 | " | " | " | " | b |
| 147 | " | $^nC_8H_{17}O-$ | " | " | a |
| 148 | " | " | " | " | b |
| 149 | " | $^nC_{12}H_{25}O-$ | " | " | d |
| 150 | " | " | " | " | e |
| 151 | " | $^nC_5H_{11}O-$ | " | " | a |
| 152 | " | " | " | " | b |
| 153 | " | $^nC_{12}H_{25}O-$ | " | " | a |
| 154 | " | " | " | " | b |
| 155 | " | $^nC_{16}H_{33}O-$ | " | " | d |
| 156 | " | " | " | " | e |
| 157 | " | " | " | " | a |
| 158 | " | " | " | " | b |
| 159 | " | $^nC_{10}H_{21}O-$ | " | " | b |
| 160 | " | $CH_3CONH-$ | " | " | d |
| 161 | " | " | " | " | a |
| 162 | " | " | " | " | b |
| 163 | " | $C_2H_5CONH-$ | " | " | b |
| 164 | " | $^nC_4H_9CONH-$ | " | " | b |
| 165 | " | $CH_3SO_2NH-$ | " | " | a |
| 166 | " | " | " | " | b |
| 167 | " | $CH_3NHCO-$ | " | " | a |
| 168 | " | " | " | " | b |
| 169 | " | $(CH_3)_2NCO-$ | " | " | a |
| 170 | " | " | " | " | b |
| 171 | " | $CH_3NHSO_2-$ | " | " | a |
| 172 | " | $(CH_3)_2NSO_2-$ | " | " | a |
| 173 | " | $CH_3O_2C-$ | " | " | a |
| 174 | " | " | " | " | b |
| 175 | \multicolumn{2}{Condensed benzene ring} | " | " | a |
| 176 | | | " | " | b |
| 177 | | | " | " | e |
| 178 | " | " | Condensed benzene ring | | d |
| 179 | " | " | Condensed benzene ring | | e |
| 180 | " | " | Condensed benzene ring | | a |
| 181 | " | " | Condensed benzene ring | | b |
| 182 | H | $(CH_3)_2N-$ | H | H | a |
| 183 | " | $HO-$ | " | " | b |
| 184 | " | $HO(CH_2)_3-$ | " | " | b |

(NOTE: Symbols (") mean ditto.)
(NOTE: Symbols (a)-(e) of X in Table 3 represent the following anions.)
a: $[PF_6]$
b: $[B(C_6H_5)_4]$
c: $[C_{12}H_{25}-C_6H_4-SO_3]$
d: Cl
e: I

TABLE 4

[IV]

| Compound No. | R¹ | R² | R³ | R⁴ | Z |
|---|---|---|---|---|---|
| 185 | H | H | H | H | a |
| 186 | " | " | " | " | b |
| 187 | " | " | " | " | c |
| 188 | " | $CH_3-$ | " | " | a' |
| 189 | " | " | " | " | b |
| 190 | " | " | " | " | c |
| 191 | " | H | $C_2H_5-$ | " | a |
| 192 | " | " | " | " | b |
| 193 | " | " | " | " | c |
| 194 | H | H | $^nC_4H_9-$ | H | a |
| 195 | " | " | " | " | b |
| 196 | " | " | " | " | c |
| 197 | " | " | $^tC_4H_9-$ | " | a' |
| 198 | " | " | " | " | b |
| 199 | " | " | " | " | c |
| 200 | " | " | $^nC_{16}H_{33}-$ | " | a |
| 201 | " | " | " | " | b |
| 202 | " | " | " | " | c |
| 203 | " | Cl | H | " | a |
| 204 | " | " | " | " | b |
| 205 | " | " | " | " | c |
| 206 | " | $CH_3-$ | $CH_3-$ | " | a' |
| 207 | " | " | " | " | b |
| 208 | " | " | " | " | c |
| 209 | " | $CH_3O-$ | H | " | a |
| 210 | " | " | " | " | b |
| 211 | " | " | " | " | c |
| 212 | " | $C_2H_5O-$ | " | " | a' |
| 213 | " | " | " | " | b |
| 214 | " | " | " | " | c |
| 215 | " | $^nC_4H_9O-$ | " | " | a' |
| 216 | " | " | " | " | b |
| 217 | H | $^nC_4H_9O-$ | H | H | c |
| 218 | " | $^nC_6H_{13}O-$ | " | " | a |
| 219 | " | " | " | " | b |
| 220 | " | " | " | " | c |
| 221 | " | $^nC_8H_{17}O-$ | " | " | a |
| 222 | " | " | " | " | b |
| 223 | " | " | " | " | c |

TABLE 4-continued

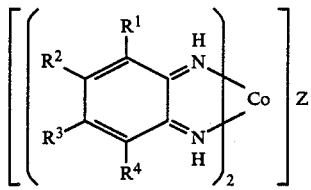

[IV]

| Compound No. | R¹ | R² | R³ | R⁴ | Z |
|---|---|---|---|---|---|
| 224 | " | $^nC_{16}H_{33}O-$ | " | " | a |
| 225 | " | " | " | " | b |
| 226 | " | " | " | " | c |
| 227 | " | CH₃(CH₂)₃CHCH₂O— <br> \| <br> C₂H₅ | " | " | a |

TABLE 4-continued

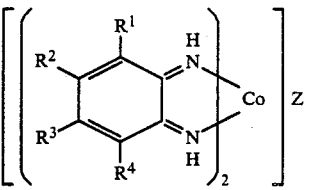

[IV]

| Compound No. | R¹ | R² | R³ | R⁴ | Z |
|---|---|---|---|---|---|
| 228 | " | " | " | " | b |
| 229 | " | " | " | " | c |

(NOTE: Symbols ('') mean ditto.)
(NOTE: Symbols (a)–(c) of Z in Table 4 represent the following anions.)
a: $Cl^-$
a': $Br^-$
b: $I^-$
c: $SCN^-$

TABLE 5

[V]

| Compound No. | R¹ | R² | R³ | R⁴ | L | Y |
|---|---|---|---|---|---|---|
| 230 | H | H | H | H | $L_1$ | a |
| 231 | " | " | " | " | " | b |
| 232 | " | " | " | " | " | c |
| 233 | " | CH₃— | " | " | " | a |
| 234 | " | " | " | " | " | b |
| 235 | " | " | " | " | " | b |
| 236 | " | " | " | " | " | e |
| 237 | " | " | " | " | " | c |
| 238 | " | " | CH₃— | " | " | d |
| 239 | " | " | " | " | " | e |
| 240 | " | " | " | " | " | a |
| 241 | " | " | " | " | " | b |
| 242 | " | H | C₂H₅— | " | " | b |
| 243 | " | " | $^nC_4H_9—$ | " | " | b |
| 244 | " | " | $^nC_{16}H_{33}—$ | " | " | a |
| 245 | " | " | " | " | " | b |
| 246 | " | Cl | H | " | " | b |
| 247 | " | CH₃O— | " | " | " | d |
| 248 | " | " | " | " | " | e |
| 249 | " | " | " | " | " | a |
| 250 | " | " | " | " | " | b |
| 251 | " | " | " | " | " | c |
| 252 | " | C₂H₅O— | " | " | " | a |
| 253 | " | " | " | " | " | b |
| 254 | " | $^nC_4H_9O—$ | H | H | $L_1$ | a |
| 255 | " | CH₃(CH₂)₃CH(C₂H₅)CH₂O— | " | " | " | b |
| 256 | " | $^nC_8H_{17}O—$ | " | " | " | a |
| 257 | " | $^nC_4H_9O—$ | " | " | " | b |
| 258 | " | $^nC_{16}H_{33}O—$ | " | " | " | d |
| 259 | " | " | " | " | " | e |
| 260 | " | " | " | " | " | a |
| 261 | " | " | " | " | " | b |
| 262 | " | CH₃CONH— | " | " | " | d |
| 263 | " | " | " | " | " | a |
| 264 | " | " | " | " | " | b |
| 265 | " | CH₃SO₂NH— | " | " | " | a |
| 266 | " | " | " | " | " | b |
| 267 | " | CH₃NHCO— | " | " | " | a |
| 268 | " | " | " | " | " | b |
| 269 | " | (CH₃)₂NCO— | " | " | " | a |
| 270 | " | " | " | " | " | b |
| 271 | " | CH₃NHSO₂— | " | " | " | a |
| 272 | " | " | " | " | " | b |
| 273 | " | (CH₃)₂NSO₂— | " | " | " | a |
| 274 | " | CH₃O₂C— | " | " | " | a |
| 275 | " | " | " | " | " | b |

TABLE 5-continued

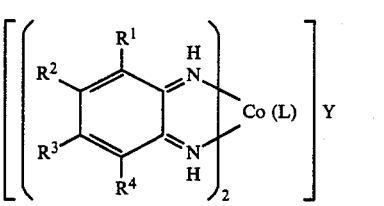

[V]

| Compound No. | R¹ | R² | R³ | R⁴ | L | Y |
|---|---|---|---|---|---|---|
| 276 | Condensed benzene ring | | H | H | $L_1$ | a |
| 277 | " | | " | " | " | b |
| 278 | " | | " | " | " | e |
| 279 | " | | " | " | " | d |
| 280 | " | | Condensed benzene ring | | " | e |
| 281 | " | | Condensed benzene ring | | " | a |
| 282 | " | | Condensed benzene ring | | " | b |
| 283 | H | $(CH_3)_2N-$ | H | H | " | a |
| 284 | " | HO— | " | " | " | b |
| 285 | " | $HO(CH_2)_3-$ | " | " | " | b |
| 286 | " | $CH_3-$ | $CH_3-$ | " | $L_2$ | a |
| 287 | " | " | " | " | $L_3$ | a |

(NOTE: Symbols (") mean ditto.)
(NOTE: Symbols (a)–(e) of Y in Table 5 stand for the following anions.)
a: $PF_6$
b: $B(C_6H_5)_4$ c: 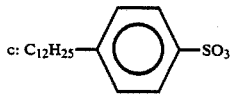

d: Cl
e: I
$L_1$: $P(C_6H_5)_3$ $L_2$: 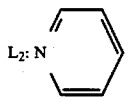

$L_3$: 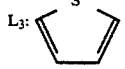

TABLE 6

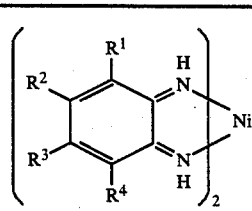

[VI]

| Compound No. | R¹ | R² | R³ | R⁴ |
|---|---|---|---|---|
| 288 | H | sec $C_4H_9-$ | H | H |
| 289 | H | $CH_3-$ | $CH_3-$ | H |
| 290 | H | $^nC_8H_{17}O-$ | H | H |

An absorption maximum ($\lambda_{max}$; nm) and a molar absorption coefficient ($\epsilon_{max}$; l·mol⁻¹·cm⁻¹) of these compounds in dichloromethane are as follows:

TABLE 7

| Compound No. | $\lambda_{max}$ | $\epsilon_{max} \times 10^{-4}$ |
|---|---|---|
| (1) | 700 | 1.64 |
| (3) | 700 | 1.63 |
| (6) | 713 | 1.63 |
| (13) | 716 | 1.64 |
| (29) | 784 | 1.64 |
| (40) | 787 | 1.64 |
| (65) | 706 | 2.37 |
| (70) | 751 | 3.00 |

TABLE 8

| Compound No. | $\lambda_{max}$ | $\epsilon_{max} \times 10^{-4}$ |
|---|---|---|
| (75) | 763 | 1.17 |
| (76) | 770 | 1.16 |
| (77) | 783 | 1.21 |
| (108) | 740 | 1.41 |
| (185) | 736 | 0.51 |
| (186) | 731 | 0.76 |
| (187) | 720 | 0.85 |

TABLE 8-continued

| Compound No. | $\lambda_{max}$ | $\epsilon_{max} \times 10^{-4}$ |
|---|---|---|
| (230) | 705 | 1.98 |

A substituent as represented by $R^1$ to $R^4$ in formulae [I]–[VI] influences a wavelength of light absorption maximum of the complex, and when an electron donating property of the substituent becomes larger, or the number of an electron donating substituent is increased, the absorption maximum tends to shift to a larger wavelength side. Further, the type of the counter anion has large influence on solubility of the complex. In the case that the counter anion is a halogen atom, $PF_6^-$, $BF_4^-$, $AlF_6^{3-}$, $SbF_6^{2-}$ or $SiF_6^{2-}$, it acts to enhance solubility to water in general. On the other hand, $B(ph)_4^-$ and alkylbenzene sulfonate anion act to enhance solubility to an organic solvent or organic binder. A lipophilic nucleus substituent of the ligand also improves solubility to an organic solvent.

The compounds as employed in the present invention may include a compound containing an anionic substituent in the aromatic ring of the complexes in the above-mentioned formulae. An example of such a compound is represented by the following formula.

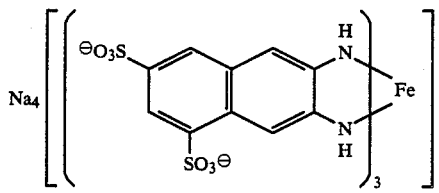

In the following, there will be described the preparation of the infrared ray absorbing material of the invention.

The infrared absorbent of the present invention may be used by allowing the compounds represented by the general formulae [I]–[VI] to be contained in a suitable binder or be coated on a suitable support. The binder may be any organic and inorganic materials capable of exhibiting an infrared absorbing property, which materials may be high polymer materials such as plastics or inorganic materials such as glass, for example.

The binder is preferably capable of forming a film which is superior in transparency and mechanical property. Examples of such a film forming binder may include polyesters such as typically polyethylene terephthalate, cellulose esters such as cellulose acetate, cellulose triacetate and cellulose acetate butylate, polyolefins such as polypropylene, polyvinyl compounds such as polyvinyl chloride, polyvinylidene chloride, vinyl chloride-vinyl acetate copolymer, and polystyrene, acrylic addition polymers such as polymethyl methacrylate, polycarbonates such as polycarbonic acid ester, phenol resin, urethane resin or gelatin as a known hydrophilic binder.

As one of methods of forming a film by adding the compounds of formulae [I]–[VI] to the above-mentioned plastic materials or incorporating the same with the plastic materials, the compounds of formulae [I]–[VI] is incorporated in the plastics before preparing the film. Namely, the compounds of formulae [I]–[VI] are mixed with a polymer powder or pellet together with various additives, and are molten to extrude the mixture by a T-die process or a tubular film process, or make the mixture into a film by calendering thereby to give a film containing the compounds as uniformly dispersed. In case of preparing the film from a polymer solution by a casting method, the compounds of formulae [I]–[VI] may be contained in the polymer solution.

In a second method, an infrared absorbing layer may be formed by applying a polymer or dispersion containing the compounds of formulae [I]–[VI] onto a surface of various plastic films or glass plates as prepared by a suitable method. A binder polymer used for a coating liquid is selected from materials having a good solubility of the compounds of formulae [I]–[VI] and a superior adhesiveness to the plastic film or glass plate as a support. For example, a suitable one of these materials may be polymethyl methacrylate, cellulose acetate butylate, or polycarbonate. Optionally, a suitable undercoat may be preliminarily formed on the support film for purpose of improving adhesiveness.

In a third method, a filter may be formed in a frame of a light window of an element to be isolated from infrared rays with use of a polymer prepared by mixing the compounds of the formulae [I]–[VI] with a polymerizable monomer and adding a suitable polymerization initiator to polymerize the mixture with heat or light. In this method, the element may be entirely enclosed by plastics as prepared from ethylene unsaturated polymerizable monomer or addition polymerizable composition such as epoxy resin.

In a fourth method, the compounds of formulae [I]–[VI] may be deposited by evaporation on a suitable support. In this method a suitable film forming binder layer as a protective layer may be formed on the deposited layer.

A method of utilizing the near-infrared absorbent of the present invention for a color solid image pick-up element is as follows:

(1) A plurality of stripe or mosaic color separation filter layers having predetermined spectral characteristics are formed, and then the near-infrared absorbent is incorporated in a surface protective layer to be formed on the filter layers, or the absorbent is deposited on the surface protective layer.

(2) The near-infrared absorbent of the present invention in combination with a visible light absorbing dyestuff may be incorporated in the color separation filter layers.

(3) The near-infrared absorbent may be incorporated in a transparent intermediate layer or a surface smooth layer provided in a multi-layer color separation filter.

An optical filter obtained by combining the infrared absorbent of the present invention with a suitable binder is especially effective when it is used in combination with color separation filters as described in Japanese patent application (OPI) Nos. 58107/82, 9317/84 and 30509/84.

In preparing an infrared absorbing material with use of the infrared absorbent of the present invention, two or more of the compounds represented by general formulae [I]–[VI] may be used in combination. Further, a known near-infrared absorbent of organic or metal complex substance may be used in combination. Particularly, when an absorbent having an absorption maximum different from that of the absorbent of the invention is used in combination, a range of absorption wavelength may be widened.

It is effective to add an ultraviolet absorbent to the infrared absorbent in the infrared absorbing material for purpose of improving a light fastness. Examples of the ultraviolet absorbent may include substituted or unsubstituted benzoates such as resorsin monobenzoate and methyl salicylate, cinnamates such as 2-oxy-3-methoxy cinnamate, benzophenones such as 2,4-dioxy-benzophenone, $\alpha,\beta$-unsaturated ketones such as 2,4-dibenzal acetone, coumarins such as 5,7-dioxy-coumarin, carbostyrils such as 1,4-dimethyl-7-oxycarbostyril, or azoles such as 2-phenyl benzoimidazole and 2-(2-hydroxyphenyl)benzotriazole.

In case of a film prepared by a coating method in combination of the infrared absorbent of the invention with a suitable binder, a thin plastic film may be attached or coated on a surface of the coating layer for purposes of protection or providing anti-stick quality. For example, a laminated film may be obtained by laminating a polyvinyl chloride film having a thickness of 0.05 mm on the coating layer and heat-bonding the whole at 120°–140° C.

In preparing the optical filter material from the infrared absorbent of the present invention, 0.1–50 parts by weight, preferably 0.5–10 parts by weight of the compounds of formulae [I]–[VI] are contained in 100 parts by weight of the binder. An optical filter is obtained by working and treating the optical filter material so as to have a sufficient degree of transmittance in a wavelength range where infrared rays are to be cut-off. Accordingly, it is necessary to adjust a content of the compounds with respect to the binder and a thickness of the filter, so as to obtain a transmittance of 10% or less, preferably 2.0% or less, and more preferably 0.1% or less in the wavelength range of 900 nm or more at the trough of a transmittance curve. Although a practical thickness of the filter is in the range of 0.002 mm to 0.5 mm, it is possible to employ any filters having a thickness out of the above range according to applications.

In the following, there will be described for applications of the infrared absorbent of the present invention to the optical information recording medium.

Although the optical recording medium of the present invention is basically constituted of a substrate and a recording layer, it may have an undercoating layer on the substrate and a protective layer on the recording layer, optionally.

The substrate employable in the present invention is selected from appropriate known materials which are transparent relative to a laser beam to be used. Typical examples of the substrate may include glass and plastics such as polyacrylate, polycarbonate, polysulfonate and polyimide. A shape of the substrate may be disc-, card-, sheet- or roll film-like, etc.

The glass or plastic substrate may have a guide channel to render the tracking easy during recording. Further, the glass or plastic substrate may be provided with an undercoating layer of plastic binder, inorganic oxide or inorganic sulfide. The undercoating layer has a heat conductivity preferably lower than that of the substrate.

The recording layer in the present invention may be classified to a layer prepared singly from $\alpha$-diimine metal complex as represented by the formulae [I]–[VI], or in combination with other materials, and a layer formed of a reflective layer and a light absorbing layer containing the $\alpha$-diimine metal complex. The recording layer prepared singly from the $\alpha$-diimine metal complex or in combination with other materials may be formed according to various processes such as coating of a solution of the $\alpha$-diimine metal complex in a solvent on the substrate, deposition of the solution on the substrate by evaporation, coating of a mixture of the metal complex with a resin solution, coating of a mixed solution of the complex with other dyes, or coating of a solution of the complex and other dye in a resin solution.

Examples of the resin to be used may include PVA, PVP, polyvinylbutylal, polycarbonate, nitrocellulose, polyvinylformal, methylvinylether, maleic anhydride copolymer or styrene-butadiene copolymer. A weight ratio of the $\alpha$-diimine metal complex represented by the formulae [I]–[VI] to the resin is preferably 0.01 or more. Other dyes, which have an absorption in a wavelength area other than that of a semiconductor laser beam, such as triarylmethane, metallocyanine, cyanine, azo or anthraquinone dyes are preferable because recording by He-Ne laser as well as the semiconductor laser is possible.

In the present invention, one or more recording layers are formed. A film thickness of the recording layer is normally 0.01–1 $\mu$m, preferably 0.08–0.8 $\mu$m. In case of reflective reading, the film thickness is most preferably odd number times as thick as $\frac{1}{4}$ of a wavelength of laser beam to be used for reading.

In the case that the reflective layer for semiconductor laser or He-Ne laser is formed, either of the following methods may be employed. That is, the reflective layer is formed on the substrate, and then the recording layer prepared singly from the $\alpha$-diimine complex of the formulae [I]–[VI] or in combination with other materials is formed on the reflective layer by the aforementioned processes. In another way, the recording layer is formed on the substrate, and then the reflective layer is formed on the recording layer.

The reflective layer may be formed by sputtering method, ion plating method or the following method.

For example, a metal salt or metal complex is dissolved in a water-soluble resin (PVP or PVA, etc.), and a reducing agent is added to the solution. Then, the solution is coated onto the substrate, and is dried with heat at 50°–150° C., preferably 60°–100° C.

A weight ratio of the metal salt or metal complex to the resin is 0.1–10, preferably 0.5–1.5. In this case, a film thickness of the recording layer is suitably such that the metal particle reflective layer has a thickness of 0.01–0.1 $\mu$m and the light absorbing layer has a thickness of 0.01–1 $\mu$m.

Examples of the metal salt or metal complex to be used may include silver nitrate, potassium silver cyanide, potassium gold cyanide, silver amine complex, silver cyan complex, gold salt and gold cyan complex. Examples of the reducing agent to be used may include formaline, tartaric acid, tartrate, hypophosphite, boron sodium hydride, and dimethyl amine boran. The reducing agent may be used in an amount of 0.2–10 mol., preferably 0.5–4 mol. per 1 mol. of the metal salt or metal complex.

In the optical recording medium of the present invention, recording of information is carried out by irradiating a spot-like high energy beam such as laser beam through the substrate onto the recording layer, or from the opposite side of the substrate onto the recording layer thereby to convert the light absorbed in the recording layer to heat, and form a pit in the recording layer.

Further, reading of information is carried out by irradiating a laser beam onto the recording layer with a low output energy not greater than a threshold energy used for recording to detect information by a change in reflection quantity of light between the pit portion and the other portion where the pit is not formed.

The infrared absorbent of the present invention has an absorption maximum at a wavelength of 700–900 nm and has a good fastness to heat and light.

Among the infrared absorbents of the present invention, an infrared absorbent comprising the metal complex represented by general formula [I] has a high transmittance of visible light. On the other hand, an infrared absorbent comprising at least one of the metal complex represented by general formulae [II]–[VI] has an absorption maximum at a wavelength of about 700–800 nm and simultaneously has high absorptivity of visible light single without being combined with other absorbents. Then, the latter infrared absorbent is utilized preferably to such applications as safelight filter for visible rays- and infrared rays-sensitive material and heat converter of visible and infrared rays.

The infrared absorbent of the present invention is a metal complex which may be easily produced by low cost raw materials such as salts of iron, cobalt or nickel, and it may be formed into an infrared absorbing material which is cost reducing and has a superior fastness to heat and light.

Further, according to the infrared absorbent of the present invention, it is possible to adjust solubility of the absorbent to a solvent by suitably selecting and combining the ligand and the counter ion in the infrared absorbent of organic metal complex. Accordingly, various binders may be widely utilized in preparing the infrared absorbing material.

The infrared absorbent of the present invention may be applied for example, to an absorbing material for simultaneously absorbing visible rays and infrared rays, to safelight filter for infrared-sensitive material, or to infrared absorbing coating material.

The optical information recording medium using the infrared absorbent of the present invention has a high sensitivity, weather resistance, hydrolysis resistance and stability, and is not deteriorated in recording characteristics and reproducing characteristics after storage.

The optical recording medium of the present invention can be applied to both a write-once type and an erasable-reusable type. In the case that a change occurring in the recording medium is permanent in dependence upon an output of semiconductor laser beam applied to the recording medium, damping factor of an optical system or recording speed, the recording medium is of the write-once type. On the other hand, in the case that the metal complex according to the present invention is used in combination especially with tellurium, its salt or its oxide to reversibly recover a change in transmittance or reflectance, the recording medium is of the erasable-reusable type.

Moreover, the infrared absorbent of the present invention is variously applicable including the optical filter and the optical information recording medium according to its infrared absorbing characteristics. For example, when the infrared absorbent is added to an ink jet printer ink as described in Japanese patent application (OPI) No. 135568/81, a reading efficiency by visible or near-infrared rays may be improved. The composition according to the present invention has such a property as of converting visible and near-infrared rays as absorbed to heat, and therefore it may be utilized as a visible and infrared rays/heat exchanger. Typical examples of such an exchanger are as follows:

(1) The composition is added to a laser heat sensitive recording material as described in Japanese patent application (OPI) Nos. 14095/82 and 14096/82 and an infrared laser is irradiated to the composition to generate heat, thereby enhancing a mixed coloring reaction.

(2) The composition may be contained in a regist material as described in Japanese patent application (OPI) No. 40256/82 which material may change solubility by a thermal function due to a laser beam.

(3) The composition may be contained in a thermodrying or thermosetting composition as described in Japanese patent application (OPI) No. 143242/81 to accelerate a reaction.

EXAMPLES

To further illustrate this invention, and not by way of limitation, the following examples are given.

REFERENCE EXAMPLE 1

[Synthesis of exemplified compound (3)]

In 200 ml of n-propanol, 12.0 g of ferrous chloride (tetrahydrate) and 6.6 g of o-phenylenediamine were dispersed, and the reaction solution refluxed in the atmosphere or argon for one hour. A light-brown bis-o-phenylenediaminato iron complex as formed was filtrated in the atmosphere of argon, and washed with deaired ethanol and with toluene successively, and dried at room temperature under reduced pressure. 4 g of the obtained iron complex after dried was taken out and 48 g of Molecular Sieve 4A (Product of Wako Junyaku Kogyo Co., Ltd. Japan) was added thereto. Then, to the mixture, 280 ml of dichloromethane and 280 ml of t-butanol were added and the mixture was stirred at 18° C. for 48 hours, with calcium chloride tube being equipped. After completion of the reaction, the reaction solution was filtrated, and the solvent in the filtrate was distilled off by a rotary evaporator in a water bath at 42° C. A residue was dissolved in a mixed solvent of 80 ml of methanol and 100 ml of water. Into the solution, a solution of 10 g of sodium tetraphenyl borate in 200 ml of water was added dropwise with stirring at 18° C. A bluish green precipitate was instantly deposited. After completion of dropping, the solution was further stirred for one hour and filtrated. The deposited crystal was washed with water, and then air-dried. The crystal was recrystallized from a mixed solvent of acetone-dichloromethane-n-hexane (1:4:2 by volume) to obtain the exemplified compound (3). (yield 2.1 g; m.p. 210° C.)

REFERENCE EXAMPLE 2

[Synthesis of exemplified compound (13)]

In 200 ml of n-propanol, 12.0 g of ferrous chloride (tetrahydrate) and 8.2 g of o-phenylenediamine were dispersed, and it was refluxed in the atmosphere of argon for one hour. A light-brown bis-(3,4-dimethyl-o-phenylenediaminato)iron complex as formed was rapidly filtrated, and washed with deaired ethanol and with toluene successively, and dried at room temperature under reduced pressure. 5 g of the obtained iron complex after dried was taken up, and 48 g of Molecular Sieve 4A was added thereto. Then, to the mixture, 280 ml of dichloromethane and 280 ml of t-butanol were added, and the mixture was stirred at 18° C. for 48 hours, being a calcium chloride tube equipped. After completion of the reaction, the reaction solution was filtrated, and the solvent in the filtrate was distilled off by a rotary evaporator in a water bath at 42° C. A residue was dissolved in a mixed solvent of 80 ml of methanol and 100 ml of water. Into the solution, a solution of 10 g of sodium tetraphenyl borate in 200 ml of water was added dropwise with stirring at 18° C. A bluish green precipitate was instantly deposited. After completion of dropping, the solution was further stirred for one hour and filtrated. The deposited crystal was washed with water, and then air-dried. The crystal was recrystallized from a mixed solvent of acetone-water (1:5 by volume) to obtain the exemplified compound (13). (yield 4.1 g; m.p. 193° C.)

REFERENCE EXAMPLE 3

[Synthesis of exemplified compound (29)]

In 200 ml of n-propanol, 10.5 g of 4-methoxy-o-phenylene-diamine hydrochloride was dissolved. To the solution, 11.6 g of sodium methoxide (28% methanol solution) was added with stirring at 18° C., and further stirred for 30 min. Then, 12.0 g of ferrous chloride (tetrahydrate) was added, and refluxed for 30 min. After completion of the reaction, the reaction solution was allowed to stand, and then a supernatant was separated off by decantation. Then, the solvent was distilled off immediately by a rotary evaporator in a water bath at 50° C. to obtain a reddish brown powder of bis-(4-methoxy-o-phenylenediaminato) iron complex. 5 g of the thus obtained iron complex was taken up and 48 g of Molecular Sieve 4A were added thereto. Then, to the mixture, 280 ml of dichloromethane and 280 ml of t-butanol were added and the solution was stirred at 18° C. for 48 hours, with a calcium chloride tube being equipped. After completion of the reaction, the reaction solution was filtrated, and solvents in the filtrate were distilled off by a rotary evaporator in a water bath at 42° C. A residue was dissolved in a mixed solvent of 80 ml of methanol and 100 ml of water. Into the solution, a solution of 10 g of sodium tetraphenyl borate in 200 ml of water was added dropwise with stirring at 18° C. A black precipitate was deposited instantly. After completion of dropping, the solution was further stirred for one hour and filtrated. The deposited crystal was washed with water, and then air-dried. The crystal was recrystallized from a mixed solvent of acetone-water (1:7 by volume) to obtain the exemplified compound (29). (yield 2.7 g; m.p. 230° C.)

REFERENCE EXAMPLE 4

[Synthesis of exemplified compound (108)]

In 400 ml of water, 20 g of cobalt acetate (tetrahydrate) was dissolved, and 100 g of concentrated aqueous ammonia was added thereto. Then, the solution was vigorously aerated for 2 hours to form a dark brown solution. To the solution, a hot aqueous solution of 18 g of o-phenylenediamine and 20 g of ammonium hexafluorophosphate in 800 ml of 50° C. water was added. Then, the solution was stirred at room temperature for 6 hours. The reaction solution was filtrated to obtain 14 g of a crude product. Then, the product was air-dried, and extracted with dichloromethane by a Soxhlet extractor to obtain the exemplified compound (108). (yield 4.6 g; decomposed at 189° C.)

EXAMPLE 1

Three kinds of optical filter were prepared by using the exemplified compounds synthesized in Reference Examples 1 to 3. That is, each component in the following compositions (1), (2) and (3) shown in parts by weight was mixed and stirred, and the mixture was filtrated and applied onto a metal support by a casting method to form a film. Then, the film was peeled off to give desired optical filters (1), (2) and (3). Several kinds of optical filter having thickness of dry films varied in the range of 0.05 to 0.3 mm were obtained.

| Composition (1) | |
| --- | --- |
| TAC (cellulose triacetate) | 170 parts |
| TPP (triphenyl phosphate) | 10 parts |
| methylene chloride | 800 parts |
| methanol | 160 parts |
| exemplified compound (3) | 2 parts |
| Composition (2) | |
| DAC (cellulose diacetate) | 170 parts |
| DEP (diethyl phthalate) | 10 parts |
| methylene chloride | 800 parts |
| methanol | 160 parts |
| exemplified compound (6) | 2 parts |
| Composition (3) | |
| PC (polycarbonate; E-2000 by Mitsubishi Gas Co., Japan) | 170 parts |
| methylene chloride | 800 parts |
| exemplified compound (29) | 2 parts |

An optical density of optical filters (1), (2) and (3) is shown in FIG. 1. The thickness of the filter as tested is 0.05 mm.

EXAMPLE 2

In a manner similar to that in Example 1, an optical filter of 0.19 mm thickness containing an ultraviolet absorbent was prepared. Composition used in a casting method is as follows:

| | |
| --- | --- |
| TAC (cellulose triacetate) | 170 parts |
| TPP (triphenyl phosphate) | 10 parts |
| methylene chloride | 800 parts |
| methanol | 160 parts |
| exemplified compound (3) | 2 parts |
| 2-(5-tert-butyl-2-hydroxyphenyl)-benzotriazole | 0.2 parts |

EXAMPLE 3

The optical filter (1) (thickness 0.05 mm) prepared in Example 1 as an ultraviolet cutfilter was mounted to a SPD. An operational performance of a photosensor was largely improved. Further, even after forced aging test at 50° C., an operational reliability was not varied at all.

EXAMPLE 4

The optical filter (2) of 0.19 mm thickness as prepared in Example 1 was adapted to a safelight in a workshop for manufacturing and working an infrared-sensitive material. Even when the safelight was used under normal conditions for one year, absorption characteristics of the safelight filter was not varied at all as compared with those before use.

Use of an ultraviolet absorbent in combination with the complex of the present invention remarkably improves light fastness of the filters. Exemplified compound (3) and 2-(5-tert-butyl-2-hydroxyphenyl)benzotriazole (compound (U)) as the ultraviolet absorbent were used in combination in the weight ratio of 10:1 in a filter. Light fastness of such filter material is shown in Table 9, in which optical density of the filter material under the condition of irradiation of light with a time elapsed is shown.

TABLE 9

| Complex in filter | Irradiation time of xenon lamp (120,000 lux) | | | |
|---|---|---|---|---|
| | 0 | | 24 hrs. | |
| | 500 nm | 700 nm | 500 nm | 700 nm |
| Exemplified compound (3) | 0.10 | 0.95 | 0.23 | 0.81 |
| Exemplified compound (3) + Compound (U) | 0.11 | 0.95 | 0.13 | 0.92 |

As will be apparent from Table 9, when the compound of the present invention and the ultraviolet absorbent are used in combination, light fastness or resistance of the optical filter can be remarkably improved.

EXAMPLE 5

A protective layer consisting of phospho-silicate glass and a smoothing layer containing the infrared absorbent as described below and having an average thickness of 5 μm were formed respectively on a surface of a CCD type solid pick-up element. Coating composition of the smoothing layer:

| | |
|---|---|
| $\left(\text{O}-\overset{\text{O}}{\overset{\|}{\text{C}}}-\text{CH}=\text{CH}-\text{C}_6\text{H}_4-\text{CH}=\text{CH}-\overset{\text{O}}{\overset{\|}{\text{C}}}-\text{OCH}_2\text{CH}_2\text{O}-\text{C}_6\text{H}_{10}-\text{OCH}_2\text{CH}_2\right)_n$ | |
| (Weight average molecular weight: about 10,000) | 15 g |
| Exemplified compound (29) of the invention | 1.5 g |
| (naphtho-thiazole =CH-C(=O)-phenyl with N-CH₃ substituent structure) | |
| (Photopolymerization initiator) | 0.23 g |
| Dibutylyl phthalate (Plasticizer) | 3.0 cc. |
| Ethylcellosolve acetate | 100 cc. |

Then, a photosetting resin layer of gelatin dichromate having a thickness of 0.7 μm was formed on the smoothing layer, and a mask of mosaic pattern (exposure pattern) was set on the photo-setting resin layer to conduct contact exposure. Then, the exposed resin layer was washed with hot water to elute off an uncured portion of the resin leaving cured resin layer of mosaic convex portion.

The cured resin layer was dyed with dye A described below to give a colored (yellow) resin film I.

Then, a color stain preventing layer comprising p-phenylene ethyldiacrylate-1,4-bis(β-hydroxyethoxy)cyclohexane was formed on the colored resin film I, and further in the same manner a photosetting resin layer was formed on the color stain preventing layer. Then, a light is irradiated through another exposure pattern onto a surface of the photosetting resin layer to form another mosaic cured resin portion. In the same manner as the above, an uncured resin portion was removed, and the cured resin layer was dyed with the dye B described below to give a colored (cyan) resin film II.

Finally, a surface coating layer was formed by p-phenylene ethyldiacrylate-1,4-bis-(β-hydroxyethoxy)cyclohexane to produce a micro color filter portion, thus giving a color solid pick-up element. When the color solid pick-up element was incorporated in a CCD color camera using a lens having no near-infrared cut-off layer, a color image having a good color reproduction property was reproduced on a Brown tube.

Dye A: Color Index (C.I.) pyridinium salt of acid yellow 141

Dye B: copper phthalocyanine tetrasulfonate pyridinium cation

EXAMPLE 6

Figure 3:
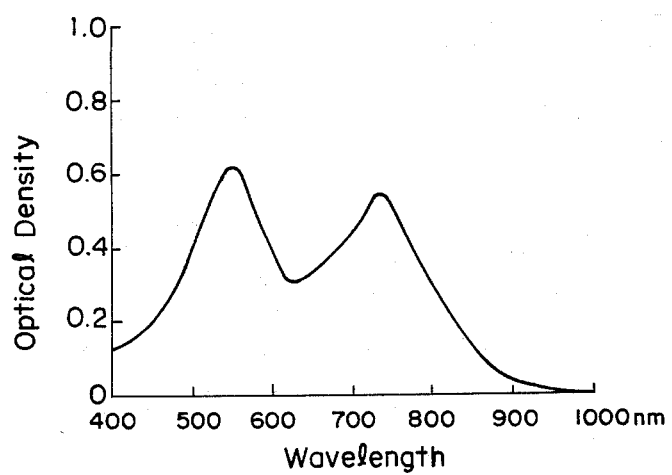
FIG. 3 is a graph of optical density curves of the optical filter obtained in Example 6.

An infrared absorbing composition was prepared by using exemplified compound (108) synthesized in Reference Example 4 to form an optical filter. That is, each component in the following composition as shown in parts by weight was mixed and stirred, and the mixture was filtrated and applied onto a metal support by a casting method to give an optical filter. Then, the film was peeled off to obtain the desired optical filter. Several kinds of optical filters having thickness of dry films varied in the range of 0.02 to 0.3 mm were obtained. An optical density of the optical filter (thickness of 30 μm) as obtained is shown in FIG. 3.

| Composition | |
|---|---|
| TAC (cellulose triacetate) | 170 parts |
| TPP (triphenyl phosphate) | 10 parts |
| methylene chloride | 800 parts |
| methanol | 160 parts |
| Exemplified compound (108) | 2 parts |

EXAMPLE 7

In a manner similar to that in Example 6, an optical filter of 0.19 mm thickness containing an ultraviolet absorbent was prepared. Composition used in a casting method is as follows:

| | |
|---|---|
| TAC (cellulose triacetate) | 170 parts |
| TPP (triphenyl phosphate) | 10 parts |
| methylene chloride | 800 parts |
| methanol | 160 parts |
| exemplified compound (108) | 2 parts |
| 2-(5-tert-butyl-2-hydroxyphenyl)-benzotriazole | 0.2 parts |

EXAMPLE 8

| Exemplified compound (3) | 1 g |
|---|---|
| nitrocellulose | 0.6 g |
| dichloromethane | 7 ml |

A solution having the above-described composition was coated with rotation coating on a glass plate, and dried at 40° C. to give a recording layer having a thickness of 0.40 μm. A reflectance and absorptivity at the wavelength of 780 nm were 14% and 25%, respectively.

In the thus obtained recording medium, a signal was recorded with a semiconductor laser beam at 1 MHz having a wavelength of 780 nm, an energy of 4 mW on an irradiated surface and a diameter of 1.6 μm. A pit having a diameter of 1.0 μm was formed with irradiation (1.6 nJ/pit) of 0.4 μsec. The obtained recording medium was stored at a temperature of 60° C. and a humidity of 90% under an interior light for one month. After the storage, recording and reading characteristics of the recording medium were not changed.

EXAMPLE 9

| Exemplified compound (13) | 1 g |
|---|---|
| polycarbonate resin | 1.0 g |
| C.I. Acid Blue 83 (C.I. 42630) | 1.2 g |
| 1,2-dichloroethane | 12 ml |

A solution having the above-described composition was coated with rotation coating on a surface cured polyacrylate plate, and dried at 60° C. to give a recording layer having a thickness of 0.4 μm. A reflectance and absorptivity at the wavelength of 800 nm were 15% and 19%, respectively, while at the wavelength of 630 nm were 13% and 60%, respectively. In the obtained recording medium, a signal was recorded with a semiconductor laser beam at 0.4 MHz having a wavelength of 800 nm, an energy of 6 mW on an irradiated surface and a beam diameter of 1.6 μm. A pit having a diameter of 1.0 μm was formed with irradiation (6.0 nJ/pit) of 1.0 μsec. Further, a signal was recorded in the recording medium with He-Ne laser beam having a beam diameter of 1.6 μm, and energy of 5 mW on a recorded surface at 4 MHz. A pit having a diameter of 1.0 μm was formed with irradiation (1.6 nJ/pit) of 0.4 μsec.

According to the storage test similar to Example 8, there occurred no change in characteristics.

EXAMPLE 10

A solution having the following composition was coated with rotation coating on a polycarbonate disc to give an undercoating layer having a thickness of 0.1 μm after drying.

| cellulose acetate butylate | 0.8 g |
|---|---|
| acetone | 32 ml |

On the undercoating layer, a solution having the following composition containing the exemplified compound (1) was coated with rotation coating to give a recording layer having a thickness of 0.4 μm after drying.

| Exemplified compound (1) | 1 g |
|---|---|
| polyvinyl formal | 1 g |
| dichloromethane | 10 g |

On the recording layer, silver was deposited by vacuum evaporation to a thickness of 0.1 μm to give a recording medium. Then, two disc-like recording mediums were bonded in such a manner that silver deposited surfaces were faced to each other, with spacers positioned at a central portion and a peripheral portion of the disc.

A semiconductor laser beam having a wavelength of 760 nm and a beam diameter of 1.6 μm was irradiated on the polycarbonate plate side of the recording medium with an energy of 6 mW on an irradiated surface. A pit having a diameter of 0.9 μm was formed with irradiation (4.8 nJ/pit) of 0.8 μsec.

The obtained recording medium was stored at a temperature of 80° C. and a humidity of 90% under an interior light for two months. As a result of the test, recording and reading characteristics of the recording medium were hardly deteriorated.

EXAMPLE 11

| Exemplified compound (40) | 1.0 g |
|---|---|
| polyvinyl formal | 0.9 g |
| dichloromethane | 12 ml |

A solution of the above composition was coated with rotation coating on a polycarbonate resin plate on which aluminum had been deposited to a thickness of 0.08 μm to give a light absorbing layer having a thickness of 0.6 μm.

A reflectance and absorptivity at the wavelength of 760 nm were 18% and 39%, respectively. In the recording medium, a signal was recorded from a substrate side with a semiconductor laser beam having a wavelength of 760 nm, an energy of 6 mW on an irradiated surface and a beam diameter of 1.6 μm at 2 MHz. A pit having a diameter of 0.8 μm was formed with irradiation (2.4 nJ/pit) of 0.4 μsec. Even after the recording medium was stored at a temperature of 60° C. and a humidity of 90% for one month, recording and reproducing characteristics of the recorded pit were not deteriorated.

EXAMPLE 12

| nitrocellulose | 0.4 g |
|---|---|
| dichloromethane | 10 ml |

A solution of the above composition was coated with rotation coating on a polyacrylate plate to give an undercoating layer, and exemplified compound (1) was deposited by vacuum evaporation on the undercoating layer to obtain a layer having a thickness of 0.2 μm. On the thus obtained layer, a solution of 0.5 g of gelatin in 100 ml of water was coated with rotation coating to give a protective layer having a thickness of 0.5 μm.

In the same manner as in Example 8, a laser beam having a wavelength of 780 nm was irradiated from a substrate side on the recording medium to form a pit having a diameter of 0.9 μm with irradiation (2.0 nJ/pit) of 0.5 μsec. The obtained recording material was stored at a temperature of 60° C. and a humidity of 90% under an interior light for one month. There occurred no change in characteristics.

REFERENCE EXAMPLE 5

| compound of the formula below | 1 g |
|---|---|
| polyvinyl alcohol | 0.6 g |
| water | 12 g |

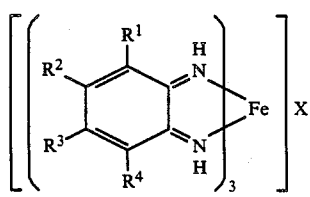

A solution having the above composition was coated with rotation coating on a glass plate, and dried at 80° C. for 8 min to give a recording film having a thickness of 0.3 μm. On the thus formed recording film, a solution having the following composition was coated with rotation coating to give a protective layer having a thickness of 0.4 μm after drying.

| cellulose acetate butylate | 0.8 g |
|---|---|
| methylisobutyl ketone | 0.2 ml |
| acetone | 0.6 ml |

A reflectance and absorptivity of the recording medium as obtained above at 780 nm were 14% and 51%, respectively.

In the recording medium a signal of 0.5 MHz was recorded from a substrate side with use of a semiconductor laser beam having a wavelength of 780 nm, an energy of 4 mW on an irradiated surface and a beam diameter of 1.6 μm. A pit having a diameter of 0.9 μm was formed with irradiation (2.8 nJ/pit) of 0.7 μsec.

Even after the recording medium was stored at a temperature of 90° C. and a humidity of 70% under an interior light for one month, recording and reproducing characteristics were not deteriorated.

Having described a specific embodiment of our bearing, it is believed obvious that modification and variation of our invention is possible in light of the above teachings.

What we claim is:

1. An infrared absorbent composition comprising at least one compound selected from metal complex compounds represented by the following general formulae [I]–[VI]:

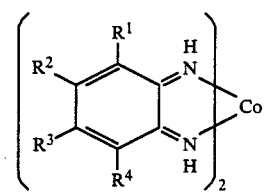

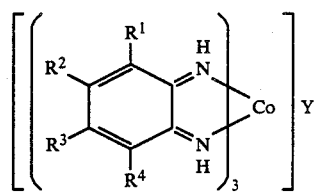

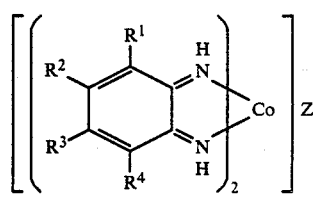

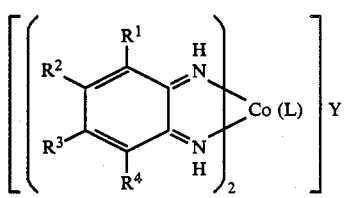

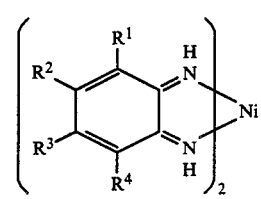

wherein, $R^1$ to $R^4$ each independently represents a hydrogen atom, halogen atom, cyano group or hydroxyl group, or a substituted or unsubstituted alkyl, aryl, cycloalkyl or heterocyclic group which may be bonded through a divalent connecting group to a benzene ring, or a group of nonmetal atoms forming at least one substituted or unsubstituted five-membered or six-membered ring by bonding of $R^1$ and $R^2$, $R^2$ and $R^3$ or $R^3$ and $R^4$; $R^1$ to $R^4$ may be the same or different; X and Y represent anions capable of neutralizing cations in the above-mentioned general formulae; Z represents a halogen and thiocyanate ion; and L represents a monodentate ligand containing a nitrogen, phosphorus or sulphur atom as a coordinate element.

2. The infrared absorbent composition as in claim 1, wherein X of the metal complex compounds is 2/m-valent cation.

3. The infrared absorbent composition as in claim 2, wherein X is selected from the group consisting of a halogen ion, nitrate ion, tetrafluoroborate ion, hexafluorophosphate ion, carboxylate ion, sulfonate ion, tetraphenylborate ion, sulphate ion, carbonate ion, hexafluoroaluminate ion, hexafluoroantimonate ion, hexafluoronickelate ion and hexafluorosilicate ion.

4. The infrared absorbent composition as in claim 1, wherein Y of said metal complex compounds is 1/n n-valent cation.

5. The infrared rays absorbent composition as in claim 4, wherein Y is selected from the group consisting of a halogen ion, nitrate ion, tetrafluoroborate ion, hexafluorophosphate ion, carboxylate ion, sulfonate ion, tetraphenylborate ion, sulphate ion, carbonate ion, hexafluoroaluminate ion, hexafluoroantimonate ion, hexafluoronickelate ion and hexafluorosilicate ion.

6. The infrared absorbent composition as in claim 1, wherein each of $R^1$ to $R^4$ of the metal complex compounds is selected from the group consisting of a hydrogen atom, halogen atom, cyano group and hydroxyl group, and a substituted or unsubstituted alkyl, aryl, cycloalkyl or heterocyclic group which may be bonded through a divalent connecting group selected from an oxy (—O—), thio (—S—), amino, oxycarbonyl, carbonyl, carbamoyl, sulfamoyl, carbonylamino, sulfonyl or carbonyloxy group to a benzene ring, and a group of nonmetal atoms forming at least one substituted or unsubstituted five-membered or six-membered ring by bonding of $R^1$ and $R^2$, $R^2$ and $R^3$ or $R^3$ and $R^4$.

7. The infrared absorbent composition as in claim 6, wherein each of $R^1$ to $R^4$ is selected from the group consisting of a hydrogen atom, and a substituted or unsubstituted alkyl and alkoxy group.

8. An infrared absorbing material comprising, as an infrared absorbent, at least one compound selected from metal complex compounds represented by the following general formulae [I]–[VI]

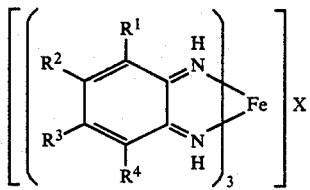

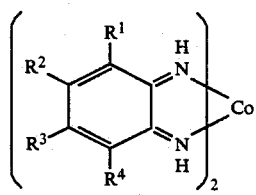

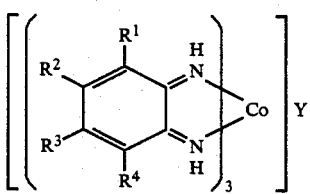

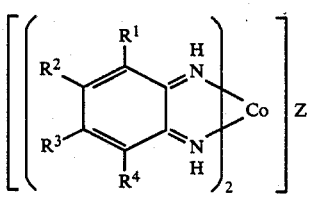

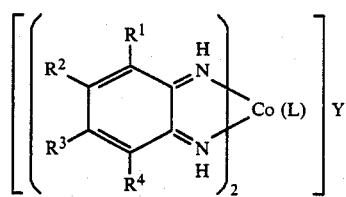

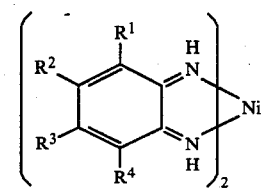

wherein, $R^1$ to $R^4$ each independently represents a hydrogen atom, halogen atom, cyano group or hydroxyl group, or a substituted or unsubstituted alkyl, aryl, cycloalkyl or heterocyclic group which may be bonded through a divalent connecting group to a benzene ring, or a group of nonmetal atoms forming at least one substituted or unsubstituted five-membered or six-membered ring by bonding of $R^1$ and $R^2$, $R^2$ and $R^3$ or $R^3$ and $R^4$; $R^1$ to $R^4$ may be the same or different; X and Y represent anions capable of neutralizing cations in the above-mentioned general formulae; Z represents a halogen and thiocyanate ion; and L represents a monodentate ligand containing a nitrogen, phosphorus or sulphur atom as a coordinate element.

9. The infrared absorbing material as in claim 8, wherein said infrared absorbing material is an optical filter.

10. The infrared absorbing material as in claim 8, wherein said infrared absorbing material is formed by allowing the infrared absorbent to be contained in a binder, or be coated on a substrate.

11. The infrared absorbing material as in claim 10, wherein said binder is a film forming binder.

12. The infrared absorbing material as in claim 10, wherein 0.1–50 parts by weight of said infrared absorbent are used per 100 parts by weight of said binder.

13. The infrared absorbing composition as in claim 1, further comprising an ultraviolet absorbent.

14. The infrared absorbing material as in claim 8, wherein an ultraviolet absorbent is used in combination.

15. The infrared absorbing material as in claim 8, wherein said infrared absorbing material is an optical information recording medium using the infrared rays absorbent in a recording layer.

16. The infrared absorbing material as in claim 15, wherein said recording layer is composed singly of said infrared absorbent or in combination with other materials, or said recording layer is used in combination with a reflective layer.

17. The infrared absorbing material as in claim 15, wherein said recording layer is formed by coating or evaporation-depositing said infrared absorbent.

18. The infrared absorbing material as in claim 17, wherein said recording layer contains 1 part by weight of the infrared absorbent per 100 parts by weight of resin.

19. The infrared absorbing material as in claim 15, wherein a film thickness of said recording layer is 0.01–1 μm.

20. A compound selected from the group consisting of the metal complex compounds represented by the following general formulae [I]-[VI]:

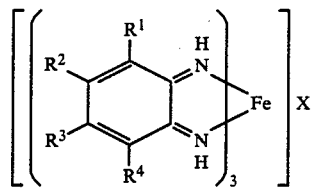

[I]

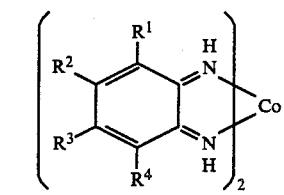

[II]

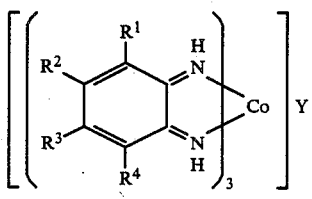

[III]

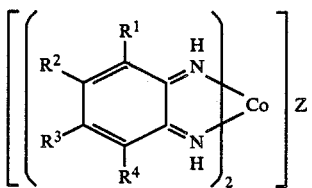

[IV]

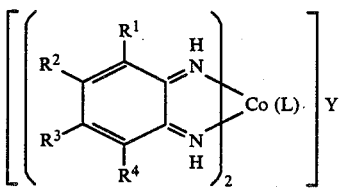

[V]

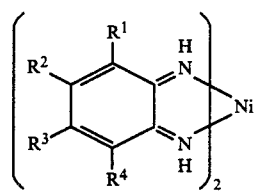

[VI]

wherein, $R^1$ to $R^4$ each independently represents a hydrogen atom, halogen atom, cyano group or hydroxyl group, or a substituted or unsubstituted alkyl, aryl, cycloalkyl or heterocyclic group which may be bonded through a divalent connecting group to a benzene ring, or a group of nonmetal atoms forming at least one substituted or unsubstituted five-membered or six-membered ring by bonding of $R^1$ and $R^2$, $R^2$ and $R^3$ or $R^3$ and $R^4$; $R^1$ to $R^4$ may be the same or different; X and Y represent anions capable of neutralizing cations in the above-mentioned general formulae; Z represents a halogen and thiocyanate ion and L represents a monodentate ligand containing a nitrogen, phosphorus or sulphur atom as a coordinate element.

21. The compound as in claim 20 wherein X of the metal complex compounds is a 2/m m-valent cation.

22. The compound as in claim 20, wherein X is selected from the group consisting of a halogen ion, nitrate ion, tetrafluoroborate ion, hexafluorophosphate ion, carboxylate ion, sulfonate ion, tetraphenylborate ion, sulphate ion, carbonate ion, hexafluoroaluminate ion, hexafluoroantimonate ion, hexafluoronickelate ion and hexafluorosilicate ion.

23. The compound of claim 20, wherein Y of said metal complex compounds is a 1/n n-valent cation.

24. The compound of claim 20, wherein Y is selected from the group consisting of a halogen ion, nitrate ion, tetrafluoroborate ion, hexafluorophosphate ion, carboxylate ion, sulfonate ion, tetraphenylborate ion, sulphate ion, carbonate ion, hexafluoroaluminate ion, hexafluoroantimonate ion, hexafluoronickelate ion and hexafluorosilicate ion.

25. The compound of claim 20, wherein each of $R^1$ to $R^4$ of the metal complex compounds is selected from the group consisting of a hydrogen atom, halogen atom, cyano group and hydroxyl group, and a substituted or unsubstituted alkyl, aryl, cycloalkyl or heterocyclic group which may be bonded through a divalent connecting group selected from an oxy (—O—), thio (—S—), amino, oxycarbonyl, carbonyl, carbamoyl, sulfamoyl, carbonylamino, sulfonyl or carbonyloxy group to a benzene ring, and a group of nonmetal atoms forming at least one substituted or unsubstituted five-membered or six-membered ring by bonding of $R^1$ and $R^2$, $R^2$ and $R^3$ or $R^3$ and $R^4$.

26. The compound of claim 20, wherein each of $R^1$ to $R^4$ is selected from the group consisting of a hydrogen atom, and a substituted or unsubstituted alkyl and alkoxy group.

* * * * *